US011739203B2

(12) United States Patent
Nishi

(10) Patent No.: US 11,739,203 B2
(45) Date of Patent: Aug. 29, 2023

(54) POLYOLEFIN RESIN MODIFIER, POLYOLEFIN RESIN COMPOSITION, MODIFIED POLYOLEFIN RESIN FILM, AND LAMINATED FILM

(71) Applicant: TAKEMOTO YUSHI KABUSHIKI KAISHA, Gamagori (JP)

(72) Inventor: Yusuke Nishi, Gamagori (JP)

(73) Assignee: TAKEMOTO YUSHI KABUSHIKI KAISHA, Gamagori (JP)

( * ) Notice: Subject to any disclaimer, the term of this patent is extended or adjusted under 35 U.S.C. 154(b) by 0 days.

(21) Appl. No.: 17/846,290

(22) Filed: Jun. 22, 2022

(65) Prior Publication Data

US 2022/0325087 A1 Oct. 13, 2022

Related U.S. Application Data

(62) Division of application No. 16/615,051, filed as application No. PCT/JP2018/008394 on Mar. 5, 2018, now abandoned.

(30) Foreign Application Priority Data

May 22, 2017 (JP) ................................ 2017-100661

(51) Int. Cl.
| | | |
|---|---|---|
| C08L 23/26 | (2006.01) | |
| C08K 3/16 | (2006.01) | |
| C08K 3/30 | (2006.01) | |
| C08K 5/06 | (2006.01) | |
| C08K 5/103 | (2006.01) | |
| C08K 5/20 | (2006.01) | |
| C08K 5/42 | (2006.01) | |
| C08L 71/02 | (2006.01) | |
| B32B 27/18 | (2006.01) | |
| B32B 27/32 | (2006.01) | |

(52) U.S. Cl.
CPC .............. *C08L 23/26* (2013.01); *B32B 27/18* (2013.01); *B32B 27/32* (2013.01); *C08K 3/16* (2013.01); *C08K 3/30* (2013.01); *C08K 5/06* (2013.01); *C08K 5/103* (2013.01); *C08K 5/20* (2013.01); *C08K 5/42* (2013.01); *C08L 71/02* (2013.01); *B32B 2307/21* (2013.01); *B32B 2323/00* (2013.01); *B32B 2439/00* (2013.01); *C08K 2003/3045* (2013.01); *C08L 2201/10* (2013.01); *C08L 2203/16* (2013.01)

(58) Field of Classification Search
CPC .. C08K 5/42; C08K 5/103; C08K 2003/3045; C08K 3/16
See application file for complete search history.

(56) References Cited

U.S. PATENT DOCUMENTS

| | | | |
|---|---|---|---|
| 2002/0045027 A1 | 4/2002 | Sawada et al. | |
| 2005/0136275 A1* | 6/2005 | Kamei | B32B 27/18 |
| | | | 428/520 |
| 2021/0163729 A1 | 6/2021 | Nishi | |

FOREIGN PATENT DOCUMENTS

| | | | | |
|---|---|---|---|---|
| CN | 105974750 A | * | 9/2016 | ............ C08F 212/08 |
| CN | 105974750 A | | 9/2016 | |
| JP | 3212435 A | | 9/1991 | |
| JP | 6158033 A | | 6/1994 | |
| JP | 2002155159 A | | 5/2002 | |
| JP | 2003236910 A | | 8/2003 | |
| JP | 2005200628 A | | 7/2005 | |
| JP | 2009142997 A | | 7/2009 | |
| JP | 4708640 B2 | * | 6/2011 | |
| JP | 2013139134 A | | 7/2013 | |
| JP | 2016102205 A | | 6/2016 | |
| JP | 2016199029 A | | 12/2016 | |

OTHER PUBLICATIONS

Machine translation of CN-105974750-A (Year: 2016).*
Machine translation of JP-4708640-B2 (Year: 2011).*
International Search Report for Application No. PCT/JP2018/008394 dated Mar. 27, 2018, 5 pages.

* cited by examiner

*Primary Examiner* — Wenwen Cai
(74) *Attorney, Agent, or Firm* — Cantor Colburn LLP

(57) ABSTRACT

Polyolefin resin modifiers are provided that contain a nonionic surfactant, an organic sulfonate salt, and an inorganic salt. The organic sulfonate salt can be at least one selected from the group consisting of alkylsulfonic acid alkali metal salts whose alkyl group has 6 to 22 carbon atoms, alkylarylsulfonic acid alkali metal salts whose alkyl group has 6 to 22 carbon atoms, and sulfonic aliphatic ester alkali metal salts whose alkyl group has 6 to 22 carbon atoms. The inorganic salt can be at least one selected from the group consisting of sodium sulfate, potassium sulfate, calcium sulfate, lithium sulfate, sodium chloride, potassium chloride, lithium chloride, magnesium chloride, and calcium chloride.

7 Claims, No Drawings

POLYOLEFIN RESIN MODIFIER, POLYOLEFIN RESIN COMPOSITION, MODIFIED POLYOLEFIN RESIN FILM, AND LAMINATED FILM

CROSS REFERENCE TO RELATED APPLICATIONS

The present application is a divisional application of U.S. patent application Ser. No. 16/615,051 filed on Nov. 19, 2019, which is a national stage application, filed under 35 U.S.C. § 371, of International Patent Application No. PCT/JP2018/008394 filed on Mar. 5, 2018, which claims priority to Japanese Patent Application No. 2017-100661 filed on May 22, 2017, each of which is incorporated by reference herein in its entirety.

TECHNICAL FIELD

The present invention relates to a polyolefin resin modifier, a polyolefin resin composition, a modified polyolefin resin film, and a laminated film, particularly to a polyolefin resin modifier capable of imparting excellent antistaticity and antifogging properties having persistency to a polyolefin resin without adversely affecting transparency and film formability intrinsic to the polyolefin resin, a polyolefin resin composition comprising such a modifier, a modified polyolefin resin film formed of such a composition, and a laminated film having such a modified polyolefin resin film as at least one surface layer thereof.

BACKGROUND ART

Films formed of polyolefin resin compositions are broadly used as materials including packaging materials. However, polyolefin resins, since intrinsically having hydrophobic properties, have the problem of causing, for example, charging and fogging due to static electricity. As modifiers for solving such a problem, there are conventionally known: a combination of a partial ester of a polyol with an aliphatic monocarboxylic acid, a nonionic surfactant such as an alkyldiethanolamine or an alkyldiethanolamide, and an organic sulfonate salt such as an alkylsulfonic acid alkali metal salt, an alkylarylsulfonic acid alkali metal salt, or a sulfonic fatty acid ester alkali metal salt (for example, see Patent Document 1); a combination of an ester compound of an aliphatic alcohol with an aliphatic monocarboxylic acid, an alkylene oxide adduct such as an alkylene oxide adduct of an aliphatic alcohol or an alkylene oxide adduct of an aliphatic monocarboxylic acid, and an organic sulfonate salt such as an alkylsulfonic acid alkali metal salt, an alkali arylsulfonic acid alkali metal salt, or a 1,2-bis(alkyloxycarbonyl)-1-ethanesulfonic acid alkali metal salt (for example, see Patent Document 2); and a combination of a polyglycerol fatty acid ester, a polyoxyalkylenealkylamine, a higher aliphatic alcohol, and a higher fatty acid glycerol ester (for example, see Patent Document 3). However, these conventional modifiers, though being capable of imparting suitable antistaticity and antifogging properties to polyolefin resins, take much time until the antistatic effect and the antifogging effect are developed, and when the amount of the modifiers added is increased, the problem of resulting in adversely affecting transparency, persistency, and film formability rises.

PRIOR ART LITERATURE

Patent Literature

Patent Document 1: Japanese Laid-Open Patent Publication No. 2003-236910
Patent Document 2: Japanese Laid-Open Patent Publication No. 2005-200628
Patent Document 3: Japanese Laid-Open Patent Publication No. 03-212435

SUMMARY OF THE INVENTION

Problem to be Solved by the Invention

The problem to be solved by the present invention is to provide a polyolefin resin modifier capable of imparting excellent antistaticity and antifogging properties having persistency to a polyolefin resin and furthermore capable of developing the antistaticity and antifogging properties in a short time without adversely affecting transparency and film formability intrinsic to the polyolefin resin, a polyolefin resin composition comprising such a modifier, a modified polyolefin resin film formed of such a composition, and a laminated film having such a modified polyolefin resin film as at least one surface layer thereof.

Means for Solving the Problem

As a result of studies to solve the above problem, the inventor of the present application has found that a polyolefin resin modifier is surely suitable that contains a specific nonionic surfactant, a specific organic sulfonate salt, and a specific inorganic salt.

That is, the present invention relates to a polyolefin resin modifier comprising a nonionic surfactant, the following organic sulfonate salt, and the following inorganic salt. The present invention relates further to a polyolefin resin composition comprising such a modifier, a modified polyolefin resin film formed of such a composition, and a laminated film having such a modified polyolefin resin film as at least one surface layer thereof.

The organic sulfonate salt is at least one selected from alkylsulfonic acid alkali metal salts whose alkyl group has 6 to 22 carbon atoms, alkylarylsulfonic acid alkali metal salts whose alkyl group has 6 to 22 carbon atoms, and sulfonic aliphatic ester alkali metal salts whose alkyl group has 6 to 22 carbon atoms.

The inorganic salt is at least one selected from sodium sulfate, potassium sulfate, calcium sulfate, lithium sulfate, sodium chloride, potassium chloride, lithium chloride, magnesium chloride, and calcium chloride.

First, the polyolefin resin modifier according to the present invention (hereinafter, referred to as modifier of the present invention) will be described.

The nonionic surfactant to be used for the modifier of the present invention is not especially limited in its kind, and examples thereof include partial esters of a tri- to hexahydric polyol with an aliphatic carboxylic acid having 6 to 22 carbon atoms, alkyldiethanolamides whose acyl group has 6 to 22 carbon atoms, ester compounds represented by the following Chemical Formula 1, ester compounds represented by the following Chemical Formula 2, and ether compounds represented by the following Chemical Formula 3; and these can be used singly or concurrently.

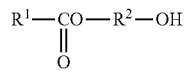

Chemical Formula 1

In Chemical Formula 1, $R^1$ is a hydrocarbon group having 5 to 21 carbon atoms, and $R^2$ is a residue of a (poly)oxyalkylene glycol from which all hydroxyl groups have been eliminated, the (poly)oxyalkylene glycol having 2 to 200 carbon atoms having a (poly)oxyalkylene group constituted of oxyalkylene units having 2 to 4 carbon atoms in its molecule.

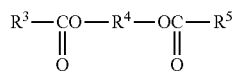

Chemical Formula 2

In Chemical Formula 2, $R^3$ and $R^5$ are each a hydrocarbon group having 5 to 21 carbon atoms, and $R^4$ is a residue of a (poly)oxyalkylene glycol from which all hydroxyl groups have been eliminated, the (poly)oxyalkylene glycol having 2 to 200 carbon atoms having a (poly)oxyalkylene group constituted of oxyalkylene units having 2 to 4 carbon atoms in its molecule.

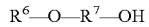

Chemical Formula 3:

In Chemical Formula 3, $R^6$ is a hydrocarbon group having 6 to 22 carbon atoms, and $R^7$ is a residue of a (poly)oxyalkylene glycol from which all hydroxyl groups have been eliminated, the (poly)oxyalkylene glycol having 2 to 200 carbon atoms having a (poly)oxyalkylene group constituted of oxyalkylene units having 2 to 4 carbon atoms in its molecule.

In the above partial esters of a tri- to hexa-hydric polyol with an aliphatic carboxylic acid having 6 to 22 carbon atoms, examples of the tri- to hexa-hydric polyol include 1) polyhydric alcohols, such as glycerol, pentaerythritol, sorbitol, and glucose, 2) cyclic ether polyhydric alcohols obtained by dehydration of sorbitol, such as sorbitan and sorbide, 3) (poly)ether tetraols, such as diglycerol and ethylene glycol diglyceryl ether, 4) (poly)ether pentaols, such as triglycerol and trimethylolpropane diglyceryl ether, and 5) (poly)ether hexaols, such as tetraglycerol and dipentaerythritol. Examples of the aliphatic carboxylic acid having 6 to 22 carbon atoms include caproic acid, sorbic acid, enanthic acid, caprylic acid, pelargonic acid, capric acid, undecylic acid, undecylenic acid, lauric acid, tridecyl acid, myristic acid, pentadecylic acid, palmitic acid, margaric acid, stearic acid, isostearic acid, arachidic acid, henicosylic acid, docosanoic acid, oleic acid, linolic acid, linolenic acid, erucic acid, 12-hydroxystearic acid, and ricinoleic acid. Examples of the combinations of a tri- to hexa-hydric polyol with an aliphatic carboxylic acid having 6 to 22 carbon atoms include ones in which the polyol is at least one selected from glycerol, glycerol condensates, such as diglycerol, and sorbitan, and the aliphatic carboxylic acid is at least one selected from aliphatic carboxylic acids having 8 to 18 carbon atoms, and more preferably ones in which the polyol is at least one selected from glycerol, diglycerol, and sorbitan, and the aliphatic carboxylic acid is at least one selected from aliphatic carboxylic acids having 8 to 18 carbon atoms. The above partial esters of a tri- to hexa-hydric polyol with an aliphatic carboxylic acid having 6 to 22 carbon atoms are obtained from suitable above-mentioned combinations of a tri- to hexa-hydric polyol with an aliphatic carboxylic acid having 6 to 22 carbon atoms, but in any cases, the obtained partial ester has at least one free hydroxyl group in its molecule.

Examples of the above alkyldiethanolamides whose acyl group has 6 to 22 carbon atoms include hexyldiethanolamide, heptyldiethanolamide, octyldiethanolamide, nonyldiethanolamide, decyldiethanolamide, undecyldiethanolamide, dodecyldiethanolamide, tridecyldiethanolamide, tetradecyldiethanolamide, cetyldiethanolamide, heptadecyldiethanolamide, octadecyldiethanolamide, behenyldiethanolamide, and oleyldiethanolamide, but among these, preferable are octyldiethanolamide, nonyldiethanolamide, decyldiethanolamide, undecyldiethanolamide, dodecyldiethanolamide, tridecyldiethanolamide, tetradecyldiethanolamide, cetyldiethanolamide, heptadecyldiethanolamide, octadecyldiethanolamide, and oleyldiethanolamide, whose acyl groups have 8 to 18 carbon atoms.

Examples of the above ester compounds represented by Chemical Formula 1 include 1) adducts of one alkylene oxide having 2 to 4 carbon atoms to an aliphatic carboxylic acid having 6 to 22 carbon atoms, 2) adducts of two or more alkylene oxides having 2 to 4 carbon atoms to an aliphatic carboxylic acid having 6 to 22 carbon atoms, 3) monoesters of an aliphatic carboxylic acid having 6 to 22 carbon atoms with a polyoxyalkylene glycol having a polyoxyalkylene group constituted of oxyalkylene units having 2 to 4 carbon atoms, and 4) monoesters of an aliphatic carboxylic acid having 6 to 22 carbon atoms with a diol compound having 2 to 4 carbon atoms, such as ethylene glycol or propylene glycol. Examples of the aliphatic carboxylic acid having 6 to 22 carbon atoms to be used as a raw material of such an ester compound include the same as described above for the nonionic surfactant. Examples of the alkylene oxide having 2 to 4 carbon atoms to be used as another raw material include alkylene oxides having 2 to 4 carbon atoms such as ethylene oxide, propylene oxide, 1,2-butylene oxide, and 1,4-butylene oxide. In the case of using two or more of the alkylene oxides, examples of the form of addition of the alkylene oxides to the aliphatic carboxylic acid having 6 to 22 carbon atoms includes random addition, block addition, and random block addition. The number of moles of the alkylene oxides to be added to 1 mol of the aliphatic carboxylic acid having 6 to 22 carbon atoms is set so that the total number of carbon atoms of the alkylene oxides falls in the range of 2 to 200. Further, examples of the (poly)oxyalkylene glycol, to be used as another raw material, having a (poly)oxyalkylene group constituted of oxyalkylene units having 2 to 4 carbon atoms includes ethylene glycol, propylene glycol, polyethylene glycol, polypropylene glycol, polybutylene glycol, and polyethylene glycol-polypropylene glycol block polymers. The amount of the (poly)oxyalkylene glycol to be used to 1 mol of the aliphatic carboxylic acid having 6 to 22 carbon atoms is set so that the total number of carbon atoms of the (poly)oxyalkylene glycol falls in the range of 2 to 200. Among the ester compounds represented by Chemical Formula 1 as described above, preferable are ones in which $R^1$ is a hydrocarbon having 7 to 17 carbon atoms and $R^2$ is a residue of a (poly)oxyalkylene glycol from which all hydroxyl groups have been eliminated, the (poly)oxyalkylene glycol having 2 to 200 carbon atoms having a (poly)oxyalkylene group constituted of oxyalkylene groups having 2 or 3 carbon atoms in its molecule; and more preferable are ones in which $R^1$ is a hydrocarbon having 7 to 17 carbon atoms and $R^2$ is a residue of a (poly)oxyalkylene glycol from which all hydroxyl groups have been eliminated, the (poly)oxyalkylene glycol having 2 to 100 carbon atoms having a (poly)oxyalkylene group constituted of oxyalkylene groups having 2 or 3 carbon atoms in its molecule.

Examples of the above ester compounds represented by Chemical Formula 2 include 1) esters of an adduct of one alkylene oxide having 2 to 4 carbon atoms to an aliphatic carboxylic acid having 6 to 22 carbon atoms, with an aliphatic carboxylic acid having 6 to 22 carbon atoms, 2) esters of an adduct of two or more alkylene oxides having 2 to 4 carbon atoms to an aliphatic carboxylic acid having 6 to 22 carbon atoms, with an aliphatic carboxylic acid having 6 to 22 carbon atoms, 3) diesters of an aliphatic carboxylic acid having 6 to 22 carbon atoms with a polyoxyalkylene glycol having a polyoxyalkylene group constituted of oxyalkylene units having 2 to 4 carbon atoms, and 4) diesters of an aliphatic carboxylic acid having 6 to 22 carbon atoms with ethylene glycol or propylene glycol. Examples of the aliphatic carboxylic acid having 6 to 22 carbon atoms, the alkylene oxide having 2 to 4 carbon atoms, and the polyoxyalkylene glycol having a polyoxyalkylene group constituted of oxyalkylene units having 2 to 4 carbon atoms to be used as raw materials of such an ester compound include the same as described above for the ester compounds represented by Chemical Formula 1. The two aliphatic carboxylic acids having 6 to 22 carbon atoms to constitute such an ester compound may be a combination of aliphatic carboxylic acids having the same number of carbon atoms or may be a combination of ones having different numbers of carbon atoms. Among the ester compounds represented by Chemical Formula 2 as described above, preferable are ones in which $R^3$ and $R^5$ are each a hydrocarbon having 7 to 17 carbon atoms and $R^4$ is a residue of a (poly)oxyalkylene glycol from which all hydroxyl groups have been eliminated, the (poly)oxyalkylene glycol having 2 to 200 carbon atoms having a (poly)oxyalkylene group constituted of oxyalkylene groups having 2 or 3 carbon atoms in its molecule; and more preferable are ones in which $R^3$ and $R^5$ are each a hydrocarbon having 7 to 17 carbon atoms and $R^4$ is a residue of a (poly)oxyalkylene glycol from which all hydroxyl groups have been eliminated, the (poly)oxyalkylene glycol having 2 to 100 carbon atoms having a (poly)oxyalkylene group constituted of oxyalkylene groups having 2 or 3 carbon atoms in its molecule.

Examples of the above ether compounds represented by Chemical Formula 3 include 1) adducts of one alkylene oxide having 2 to 4 carbon atoms to a monohydric aliphatic alcohol having 6 to 22 carbon atoms, and 2) adducts of two or more alkylene oxides having 2 to 4 carbon atoms to a monohydric aliphatic alcohol having 6 to 22 carbon atoms. Examples of the monohydric aliphatic alcohol having 6 to 22 carbon atoms to be used as a raw material of such an ether compound include caproic alcohol, heptyl alcohol, caprylic alcohol, pelargonic alcohol, capric alcohol, undecyl alcohol, lauryl alcohol, tridecyl alcohol, myristyl alcohol, pentadecyl alcohol, cetyl alcohol, isocetyl alcohol, heptadecyl alcohol, stearyl alcohol, isostearyl alcohol, arachidyl alcohol, behenyl alcohol, palmitoreyl alcohol, oleyl alcohol, linoleyl alcohol, linolenyl alcohol, erucyl alcohol, ricinoleyl alcohol, and secondary alcohols having 6 to 22 carbon atoms. Examples of the alkylene oxide having 2 to 4 carbon atoms to be used as another raw material includes the same as described above for the ester compounds of Chemical Formula 1. Among the ether compounds represented by Chemical Formula 3 as described above, preferable are ones in which $R^6$ is a hydrocarbon having 8 to 18 carbon atoms and $R^7$ is a residue of a (poly)oxyalkylene glycol from which all hydroxyl groups have been eliminated, the (poly)oxyalkylene glycol having 2 to 200 carbon atoms having a (poly)oxyalkylene group constituted of oxyalkylene groups having 2 or 3 carbon atoms in its molecule; and more preferable are ones in which $R^6$ is a hydrocarbon having 8 to 18 carbon atoms and $R^7$ is a residue of a (poly)oxyalkylene glycol from which all hydroxyl groups have been eliminated, the (poly)oxyalkylene glycol having 2 to 120 carbon atoms having a (poly)oxyalkylene group constituted of oxyalkylene groups having 2 or 3 carbon atoms in its molecule.

Hitherto, the nonionic surfactants have been described, but among these, preferable nonionic surfactants are partial esters of the above tri- to hexa-hydric polyol with an aliphatic carboxylic acid having 8 to 18 carbon atoms, ester compounds represented by Chemical Formula 1 in which $R^1$ is a hydrocarbon having 7 to 17 carbon atoms, ester compounds represented by Chemical Formula 2 in which $R^3$ and $R^5$ are each a hydrocarbon having 7 to 17 carbon atoms, and ether compounds represented by Chemical Formula 3 in which $R^6$ is a hydrocarbon having 8 to 18 carbon atoms; and more preferable nonionic surfactants are partial esters of glycerol, diglycerol, and sorbitan with an aliphatic carboxylic acid having 8 to 18 carbon atoms, ester compounds represented by Chemical Formula 1 in which $R^1$ is a hydrocarbon having 7 to 17 carbon atoms and $R^2$ is a residue of a (poly)oxyalkylene glycol from which all hydroxyl groups have been eliminated, the (poly)oxyalkylene glycol having 2 to 100 carbon atoms having a (poly)oxyalkylene group constituted of oxyalkylene groups having 2 or 3 carbon atoms in its molecule, ester compounds represented by Chemical Formula 2 in which $R^3$ and $R^5$ are each a hydrocarbon having 7 to 17 carbon atoms and $R^4$ is a residue of a (poly)oxyalkylene glycol from which all hydroxyl groups have been eliminated, the (poly)oxyalkylene glycol having 2 to 100 carbon atoms having a (poly)oxyalkylene group constituted of oxyalkylene groups having 2 or 3 carbon atoms in its molecule, and ether compounds represented by Chemical Formula 3 in which $R^6$ is a hydrocarbon having 8 to 18 carbon atoms and $R^7$ is a residue of a (poly)oxyalkylene glycol from which all hydroxyl groups have been eliminated, the (poly)oxyalkylene glycol having 2 to 120 carbon atoms having a (poly)oxyalkylene group constituted of oxyalkylene groups having 2 or 3 carbon atoms in its molecule.

Specific examples of such nonionic surfactants include partial esters of glycerol with caprylic acid, partial esters of glycerol with lauric acid, partial esters of glycerol with stearic acid, partial esters of glycerol with oleic acid, partial esters of diglycerol with caprylic acid, partial esters of diglycerol with lauric acid, partial esters of diglycerol with stearic acid, partial esters of diglycerol with oleic acid, partial esters of sorbitan with caprylic acid, partial esters of sorbitan with lauric acid, partial esters of sorbitan with stearic acid, partial esters of sorbitan with oleic acid, ethylene oxide adducts (addition molar number: 1 to 50) of caprylic acid, ethylene oxide adducts (addition molar number: 1 to 50) of lauric acid, ethylene oxide adducts (addition molar number: 1 to 50) of stearic acid, ethylene oxide adducts (addition molar number: 1 to 50) of oleic acid, propylene oxide adducts (addition molar number: 1 to 33) of caprylic acid, propylene oxide adducts (addition molar number: 1 to 33) of lauric acid, propylene oxide adducts (addition molar number: 1 to 33) of stearic acid, propylene oxide adducts (addition molar number: 1 to 33) of oleic acid, monoesters of caprylic acid with a (poly)ethylene glycol (having 2 to 100 carbon atoms), monoesters of lauric acid with a (poly)ethylene glycol (having 2 to 100 carbon atoms), monoesters of stearic acid with a (poly)ethylene glycol (having 2 to 100 carbon atoms), monoesters of oleic acid with a (poly)ethylene glycol (having 2 to 100 carbon atoms), monoesters of caprylic acid with a (poly)propylene glycol (having 3 to 99 carbon atoms), monoesters of lauric acid with a (poly)propylene glycol (having 3 to 99 carbon atoms), monoesters of stearic acid with a (poly)propylene glycol (having 3 to 99 carbon atoms), monoesters of oleic acid and a (poly)propylene glycol (having 3 to 99 carbon atoms), esters of an ethylene oxide adduct (addition molar number: 1 to 50) of caprylic acid with caprylic acid, esters of an ethylene oxide adduct (addition molar number: 1 to 50) of lauric acid with lauric acid, esters of an ethylene oxide adduct (addition molar number: 1 to 50) of lauric acid with stearic acid, esters of an ethylene oxide adduct (addition molar number: 1 to 50) of stearic acid with stearic acid, esters of an ethylene oxide adduct (addition molar number: 1 to 50) of oleic acid with oleic acid, esters of an ethylene oxide adduct (addition molar number: 1 to 50) of oleic acid with lauric acid, esters of a propylene oxide adduct (addition molar number: 1 to 33) of caprylic acid with caprylic acid, esters of a propylene oxide adduct (addition molar number: 1 to 33) of lauric acid with lauric acid, esters of a propylene oxide adduct (addition molar number: 1 to 33) of stearic acid with stearic acid, esters of a propylene oxide adduct (addition molar number: 1 to 33) of oleic acid with oleic acid, diesters of caprylic acid with a (poly)ethylene glycol (having 2 to 100 carbon atoms), diesters of lauric acid with a (poly)ethylene glycol (having 2 to 100 carbon atoms), diesters of stearic acid with a (poly)ethylene glycol (having 2 to 100 carbon atoms), diesters of oleic acid with a (poly)ethylene glycol (having 2 to 100 carbon atoms), diesters of caprylic acid with a (poly)propylene glycol (having 3 to 99 carbon atoms), diesters of lauric acid with a (poly)propylene glycol (having 3 to 99 carbon atoms), diesters of stearic acid with a (poly)propylene glycol (having 3 to 99 carbon atoms), diesters of oleic acid with a (poly)propylene glycol (having 3 to 99 carbon atoms), ethylene oxide adducts (addition molar number: 1 to 60) of caprylic alcohol, ethylene oxide adducts (addition molar number: 1 to 60) of lauryl alcohol, ethylene oxide adducts (addition molar number: 1 to 60) of stearyl alcohol, ethylene oxide adducts (addition molar number: 1 to 60) of oleyl alcohol, ethylene oxide adducts (addition molar number: 1 to 60) of a secondary alcohol having 9 to 11 carbon atoms, ethylene oxide adducts (addition molar number: 1 to 60) of a secondary alcohol having 11 to 15 carbon atoms, propylene oxide adducts (addition molar number: 1 to 40) of caprylic alcohol, propylene oxide adducts (addition molar number: 1 to 40) of lauryl alcohol, propylene oxide adducts (addition molar number: 1 to 40) of stearyl alcohol, propylene oxide adducts (addition molar number: 1 to 40) of oleyl alcohol, propylene oxide adducts (addition molar number: 1 to 40) of a secondary alcohol having 9 to 11 carbon atoms, and propylene oxide adducts (addition molar number: 1 to 40) of a secondary alcohol having 11 to 15 carbon atoms.

The organic sulfonate salt to be used for the modifier of the present invention is at least one selected from alkylsulfonic acid alkali metal salts whose alkyl group has 6 to 22 carbon atoms, alkylarylsulfonic acid alkali metal salts whose alkyl group has 6 to 22 carbon atoms, and sulfonic aliphatic ester alkali metal salts whose alkyl group has 6 to 22 carbon atoms. These can be used singly or concurrently.

Examples of the alkylsulfonic acid alkali metal salts whose alkyl group has 6 to 22 carbon atoms include lithium hexylsulfonate, sodium hexylsulfonate, potassium hexylsulfonate, lithium octylsulfonate, sodium octylsulfonate, potassium octylsulfonate, lithium nonylsulfonate, sodium nonylsulfonate, potassium nonylsulfonate, lithium decylsulfonate, sodium decylsulfonate, potassium decylsulfonate, lithium undecylsulfonate, sodium undecylsulfonate, potassium undecylsulfonate, lithium dodecylsulfonate, sodium dodecylsulfonate, potassium dodecylsulfonate, lithium tridecylsulfonate, sodium tridecylsulfonate, potassium tridecylsulfonate, lithium tetradecylsulfonate, sodium tetradecylsulfonate, potassium tetradecylsulfonate, lithium pentadecylsulfonate, sodium pentadecylsulfonate, potassium pentadecylsulfonate, lithium hexadecylsulfonate, sodium hexadecylsulfonate, potassium hexadecylsulfonate, lithium heptadecylsulfonate, sodium heptadecylsulfonate, potassium heptadecylsulfonate, lithium octadecylsulfonate, sodium octadecylsulfonate, potassium octadecylsulfonate, lithium behenylsulfonate, sodium behenylsulfonate, and potassium behenylsulfonate.

Examples of the alkylarylsulfonic acid alkali metal salts whose alkyl group has 6 to 22 carbon atoms include lithium hexylbenzenesulfonate, sodium hexylbenzenesulfonate, potassium hexylbenzenesulfonate, lithium octylbenzenesulfonate, sodium octylbenzenesulfonate, potassium octylbenzenesulfonate, lithium nonylbenzenesulfonate, sodium nonylbenzenesulfonate, potassium nonylbenzenesulfonate, lithium decylbenzenesulfonate, sodium decylbenzenesulfonate, potassium decylbenzenesulfonate, lithium undecylbenzenesulfonate, sodium undecylbenzenesulfonate, potassium undecylbenzenesulfonate, lithium dodecylbenzenesulfonate, sodium dodecylbenzenesulfonate, potassium dodecylbenzenesulfonate, lithium tridecylbenzenesulfonate, sodium tridecylbenzenesulfonate, potassium tridecylbenzenesulfonate, lithium tetradecylbenzenesulfonate, sodium tetradecylbenzenesulfonate, potassium tetradecylbenzenesulfonate, lithium pentadecylbenzenesulfonate, sodium pentadecylbenzenesulfonate, potassium pentadecylbenzenesulfonate, lithium hexadecylbenzenesulfonate, sodium hexadecylbenzenesulfonate, potassium hexadecylbenzenesulfonate, lithium heptadecylbenzenesulfonate, sodium heptadecylbenzenesulfonate, potassium heptadecylbenzenesulfonate, lithium octadecylbenzenesulfonate, sodium octadecylbenzenesulfonate, potassium octadecylbenzenesulfonate, lithium behenylbenzenesulfonate, sodium behenylbenzenesulfonate, potassium behenylbenzenesulfonate, lithium dibutylnaphthalenesulfonate, sodium dibutylnaphthalenesulfonate, and potassium dibutylnaphthalenesulfonate.

Examples of the sulfonic aliphatic ester alkali metal salts whose alkyl group has 2 to 22 carbon atoms include sodium diethyl sulfosuccinate, sodium dipropyl sulfosuccinate, sodium dioctyl sulfosuccinate, lithium didodecyl sulfosuccinate, lithium dieicosyl sulfosuccinate, sodium dodecyl sulfoacetate, and potassium nonylphenoxypolyethylene glycol (repeating number of oxyethylene units: 1 to 10) sulfoacetate.

Hitherto, the organic sulfonate salts have been described, but among these, preferable organic sulfonate salts are alkylsulfonic acid alkali metal salts whose alkyl group has 6 to 22 carbon atoms; and specific examples of such organic sulfonate salts include sodium hexylsulfonate, sodium octylsulfonate, sodium nonylsulfonate, sodium decylsulfonate, sodium undecylsulfonate, sodium dodecylsulfonate, sodium tridecylsulfonate, sodium tetradecylsulfonate, sodium pentadecylsulfonate, sodium hexadecylsulfonate, sodium heptadecylsulfonate, sodium octadecylsulfonate, and sodium behenylsulfonate.

The inorganic salt to be used for the modifier of the present invention is at least one selected from sodium sulfate, potassium sulfate, calcium sulfate, lithium sulfate, sodium chloride, potassium chloride, lithium chloride, magnesium chloride, and calcium chloride. Among these, preferable inorganic salt is sodium sulfate and/or sodium chloride. Such inorganic salts can be used singly or concurrently.

The modifier of the present invention contains the nonionic surfactant, the organic sulfonate salt, and the inorganic salt described above, which are preferably contained in the modifier at a mass ratio of (the nonionic surfactant+the organic sulfonate salt)/the inorganic salt=99.9995/0.0005 to 75/25.

Next, the polyolefin resin composition according to the present invention (hereinafter, referred to as resin composition of the present invention) will be described. The resin composition of the present invention contains a polyolefin resin and the modifier of the present invention described above, which are preferably contained in the resin composition in amounts of 99.9% to 95.0% by mass and 0.1% to 5.0% by mass, respectively, so that the sum of the amounts of the polyolefin resin and the modifier of the present invention is equal to 100% by mass.

Examples of the polyolefin resin to be used for the resin composition of the present invention include 1) α-olefin homopolymers, such as polyethylene and polypropylene, obtained from one selected from α-olefins having 2 to 8 carbon atoms, such as ethylene, propylene, 1-butene, 1-hexene, 4-methylpentene-1, and 1-octene, 2) α-olefin copolymers, such as ethylene-propylene copolymers, ethylene-1-butene copolymers, and ethylene-1-hexene copolymers, obtained from two or more selected from α-olefins having 2 to 8 carbon atoms, as described above, 3) copolymers obtained from ethylene and vinyl acetate, 4) ethylene-vinyl alcohol copolymers obtained by saponification of copolymers obtained from ethylene and vinyl acetate, 5) ethylene-acrylic acid copolymers obtained from ethylene and one or more selected from acrylic acid, methyl acrylate, and ethyl acrylate, and 6) ethylene-methacrylic acid copolymers obtained from ethylene and one or more selected from methacrylic acid and methyl methacrylate. Among these, preferable α-olefin copolymers of 2) are copolymers of ethylene with an α-olefin having 4 to 8 carbon atoms that contain 1% to 50% by mass of units constituted of the α-olefin having 4 to 8 carbon atoms. Such an α-olefin copolymer is preferably obtained, for example, by a gas phase method or a solution polymerization method using a known homogeneous catalyst such as a highly active Ziegler catalyst or a metallocene catalyst and more preferably has a density of 0.86 to 0.94 g/cm$^3$ and an MFR of 0.01 to 30 g/10 min. The olefin resins exemplified above may be used as a mixture of two or more thereof.

The resin composition of the present invention may purposively contain other agents. Examples of such other agents include heat stabilizers, antioxidants, neutralizers, lubricants, weatherproofing agents, ultraviolet absorbents, and anti-blocking agents, but it is preferable that the content of these other agents is as low as possible. Particularly in the case of causing an anti-blocking agent to be contained, it is preferable to use, as the anti-blocking agent, inorganic particles of an oxide, such as silica, diatomaceous earth, alumina, iron oxide, or ferrite; inorganic particles of an silicate, such as zeolite, talc, wollastonite, mica, or clay; or organic crosslinked particles, such as crosslinked silicone particles, crosslinked polyamide particles, crosslinked polytriazine particles, crosslinked polyacryl particles, or crosslinked polystyrene particles. Also in this case, it is preferable that the polyolefin resin and the anti-blocking agent are contained in the resin composition in amounts of 99.9 to 70.0 parts by mass and 0.1 to 30.0 parts by mass, respectively, so that the sum of the amounts of the polyolefin resin and the anti-blocking agent is equal to 100 parts by mass.

The resin composition of the present invention can be prepared by a known method. Examples of the method includes 1) a method of fabricating a master batch containing a polyolefin resin, the nonionic surfactant, the organic sulfonate salt, and the inorganic salt in high concentrations, and then mixing the master batch with a polyolefin resin to thereby prepare a predetermined polyolefin resin composition, 2) a method of charging and mixing a polyolefin resin, the nonionic surfactant, the organic sulfonate salt, and the inorganic salt in a mixing machine, such as a tumbler blender, a Supermixer, or a Henschel mixer, and then granulating the mixture while melt kneading the mixture with an extruding machine, such as a single-screw extruder or a multi-screw extruder, to thereby prepare a predetermined polyolefin resin composition, 3) a method of mixing the nonionic surfactant, the organic sulfonate salt, and the inorganic salt through side feed or by liquid injection in a polyolefin resin made into a melt state with an extruding machine, such as a single-screw extruder or a multi-screw extruder, and then granulating the mixture under melt kneading to thereby prepare a predetermined polyolefin resin composition, and 4) a method of combining 2) and 3). The production of the master batch of 1) can be carried out as in the above 2), 3) and 4). As means of mixing the polyolefin resin with the nonionic surfactant, the organic sulfonate salt, and the inorganic salt, which method is adopted out of the mixing by a mixing machine, such as a tumbler blender, a Supermixer, or a Henschel mixer, and the side feed and the liquid injection depends on the form of the polyolefin resin, the nonionic surfactant, the organic sulfonate salt, and the inorganic salt. In the case of being a solid form, the mixing by a mixing machine such as a tumbler blender, a Supermixer, or a Henschel mixer, or the side feed is adopted. In the case of being a liquid form, the liquid injection or the mixing machine such as a Supermixer or a Henschel mixer is adopted. A solid material may be mixed as a liquid or fluid after the solid material is dissolved or dispersed in a liquid material.

Next, the modified polyolefin resin film according to the present invention (hereinafter, referred to as film of the present invention) will be described. The film of the present invention is formed by using the resin composition of the present invention. A known method can be used for forming the film, and examples of such a method include inflation molding, such as air-cooling inflation molding, air-cooling two-stage inflation molding, or water-cooling inflation molding, and T-die molding using, as a T die, a straight manifold type, a coat hanger type, or a combination thereof. The film of the present invention may use either molding method of non-stretching and stretching, and examples of such a stretching method includes a successive biaxial stretching method, a simultaneous biaxial stretching method, and a tubular biaxial stretching method.

Finally, the laminated film according to the present invention (hereinafter, referred to as laminated film of the present invention) will be described. The laminated film of the present invention is a two- or more layer laminated film, and at least one surface layer of the laminated film is formed by using the resin composition of the present invention. The other layer for which the resin composition of the present invention is not used is constituted of, for example, a thermoplastic resin, an adhesive, an anchor coating agent, an adhesive resin, or a metal, such as aluminum. Examples of such a thermoplastic resin include polyolefin resins; polyesters, such as polyethylene terephthalate; polyamides, such as nylon 6; polyvinyl alcohol; polystyrene; and acryl resins, such as methyl polymethacrylate. Such a thermoplastic resin may purposively contain additives. Examples of such additives include heat stabilizers, antioxidants, neutralizers, lubricants, weatherproofing agents, ultraviolet absorbents, anti-blocking agents, antistatic agents, and antifogging agents.

The laminated film of the present invention can be produced by a known method. Examples of such a production method include a dry lamination method, a sandwich lamination method, an extrusion lamination method, and a coextrusion method. In the case where the laminated film is produced by a dry lamination method, a sandwich lamination method, or an extrusion lamination method, a known polyurethane adhesive, organotitanium anchor coating agent, isocyanate anchor coating agent, or adhesive resin can be used. In the production by a coextrusion method, the inflation molding and the T-die molding described above can be used, and either molding method of non-stretching and stretching described above can also be used.

Effect of the Invention

The present invention having been described hitherto can impart excellent antistaticity and antifogging properties having persistency to a polyolefin resin, and moreover can develop such antistaticity and antifogging properties in a short time, without adversely affecting transparency and film formability intrinsic to the polyolefin resin.

EXAMPLES

Hereinafter, in order to more embodying the constitution and advantageous effects of the present invention, examples and the like will be cited, but the present invention is not any more limited to these examples. Here, in the following examples and comparative examples, parts means parts by mass, and % means % by mass.

Test Section 1 (Preparation of Polyolefin Resin Modifiers)

Example 1

68.18 parts of a partial ester (A-1) of diglycerol with lauric acid as a nonionic surfactant, 29.22 parts of a sodium alkylsulfonate (S-1) whose alkyl group has 13 to 18 carbon atoms as an organic sulfonate salt, and 2.60 parts of sodium sulfate as an inorganic salt were homogeneously mixed to thereby prepare a polyolefin resin modifier (F-1) of Example 1.

Examples 2 to 43, and Comparative Examples 1 to 6

Polyolefin resin modifiers (F-2) to (F-43) and (f-1) to (f-6) of Examples 2 to 43 and Comparative Examples 1 to 6, respectively, were prepared as in the polyolefin resin modifier (F-1) of Example 1. The details of the prepared polyolefin resin modifiers of those examples and comparative examples are shown in Table 1 collectively with the details of the polyolefin resin modifier (F-1) of Example 1.

TABLE 1

| | Item | | Nonionic Surfactant Kind | Content (%) | Organic Sulfonate Salt Kind | Content (%) | Inorganic Salt Kind | Content (%) | *1 |
|---|---|---|---|---|---|---|---|---|---|
| Example | 1 | F-1 | A-1 | 68.18 | S-1 | 29.22 | sodium sulfate | 2.60 | 97.4/2.6 |
| | 2 | F-2 | A-2 | 66.53 | S-2 | 33.27 | sodium sulfate | 0.20 | 99.8/0.2 |
| | 3 | F-3 | A-3 | 47.75 | S-2 | 47.75 | sodium chloride | 4.50 | 95.5/4.5 |
| | 4 | F-4 | A-4 | 83.33 | S-2 | 16.67 | sodium chloride | 0.0005 | 99.9995/0.000 |
| | 5 | F-5 | C-1 | 39.96 | S-2 | 59.94 | sodium sulfate | 0.10 | 5 |
| | 6 | F-6 | C-2 | 80.83 | S-2 | 16.17 | sodium chloride | 3.00 | 99.9/0.1 |
| | 7 | F-7 | C-3 | 90.43 | S-2 | 3.77 | sodium sulfate | 5.80 | 97/3 |
| | 8 | F-8 | C-4 | 52.00 | S-2 | 48.00 | sodium sulfate | 0.0020 | 94.2/5.8 |
| | 9 | F-9 | D-1 | 74.99 | S-2 | 25.00 | sodium sulfate | 0.0180 | 99.998/0.002 |
| | 10 | F-10 | D-2 | 79.32 | S-2 | 14.93 | sodium chloride | 5.75 | 99.982/0.018 |
| | 11 | F-11 | E-1 | 70.68 | S-3 | 5.32 | sodium sulfate | 24.0 | 94.2541/5.746 |
| | 12 | F-12 | E-2 | 87.57 | S-4 | 9.73 | sodium chloride | 2.70 | 76/24 |
| | 13 | F-13 | A-1 | 64.53 | S-5 | 32.27 | sodium sulfate | 3.20 | 97.3/2.7 |
| | 14 | F-14 | A-2 | 70.30 | S-6 | 24.70 | sodium chloride | 5.00 | 96.8/3.2 |
| | 15 | F-15 | A-5 | 94.97 | S-2 | 5.00 | sodium sulfate | 0.0300 | 95/5 |
| | 16 | F-16 | A-6 | 69.30 | S-2 | 20.70 | sodium sulfate | 10.00 | 99.97/0.03 |
| | 17 | F-17 | B-1 | 51.20 | S-2 | 28.80 | sodium chloride | 20.00 | 90/10 |
| | 18 | F-18 | B-2 | 70.00 | S-2 | 30.00 | sodium sulfate | 0.0010 | 80/20 |
| | 19 | F-19 | C-1 | 49.14 | S-6 | 28.86 | sodium chloride | 22.00 | 99.999/0.001 |
| | 20 | F-20 | C-2 | 83.32 | S-6 | 16.66 | sodium sulfate | 0.0150 | 78/22 |
| | 21 | F-21 | D-3 | 76.28 | S-6 | 21.52 | sodium chloride | 2.20 | 99.985/0.015 |
| | 22 | F-22 | D-4 | 65.90 | S-7 | 29.61 | sodium sulfate | 4.50 | 97.8/2.2 |
| | 23 | F-23 | E-3 | 49.15 | S-7 | 49.15 | sodium sulfate | 1.70 | 95.5/4.5 |
| | 24 | F-24 | E-4 | 91.68 | S-6 | 4.83 | sodium sulfate | 3.50 | 98.3/1.7 |
| | 25 | F-25 | B-3 | 81.00 | S-6 | 16.20 | potassium chloride | 2.80 | 96.5/3.5 |
| | 26 | F-26 | B-4 | 68.00 | S-6 | 17.00 | potassium chloride | 15.00 | 97.2/2.8 |
| | 27 | F-27 | A-1 | 72.90 | S-6 | 24.30 | potassium chloride | 2.80 | 85/15 |
| | 28 | F-28 | A-2 | 71.48 | S-8 | 23.83 | potassium chloride | 4.70 | 97.2/2.8 |
| | 29 | F-29 | C-1 | 77.28 | S-6 | 14.72 | potassium chloride | 8.00 | 95.3/4.7 |
| | 30 | F-30 | C-2 | 58.67 | S-6 | 29.33 | potassium chloride | 12.00 | 92/8 |
| | 31 | F-31 | D-1 | 64.78 | S-6 | 14.22 | potassium chloride | 21.00 | 88/12 |
| | 32 | F-32 | D-2 | 56.67 | S-6 | 28.33 | magnesium chloride | 15.00 | 79/21 |
| | 33 | F-33 | D-1 | 49.10 | S-6 | 49.10 | chloride | 1.80 | 85/15 |
| | 34 | F-34 | D-2 | 91.65 | S-6 | 5.85 | calcium chloride | 2.50 | 98.2/1.8 |
| | 35 | F-35 | B-1 | 66.67 | S-8 | 13.33 | potassium chloride | 20.00 | 97.5/2.5 |
| | 36 | F-36 | B-2 | 83.26 | S-6 | 7.24 | potassium chloride | 9.50 | 80/20 |
| | 37 | F-37 | C-5 | 40.00 | S-6 | 40.00 | potassium chloride | 20.00 | 90.5/9.5 |
| | 38 | F-38 | D-5 | 87.30 | S-6 | 2.70 | potassium chloride | 10.00 | 80/20 |

TABLE 1-continued

| | Item | Kind | Nonionic Surfactant Kind | Nonionic Surfactant Content (%) | Organic Sulfonate Salt Kind | Organic Sulfonate Salt Content (%) | Inorganic Salt Kind | Inorganic Salt Content (%) | *1 |
|---|---|---|---|---|---|---|---|---|---|
| | 39 | F-39 | E-5 | 76.40 | S-6 | 19.10 | potassium chloride | 4.50 | 90/10 |
| | 40 | F-40 | A-7 | 79.71 | S-6 | 15.59 | potassium chloride | 4.70 | 95.5/4.5 |
| | 41 | F-41 | A-8 | 59.05 | S-8 | 33.75 | potassium chloride | 7.20 | 95.3/4.7 |
| | 42 | F-42 | B-5 | 86.53 | S-6 | 13.46 | potassium chloride | 0.0050 | 92.8/7.2 |
| | 43 | F-43 | B-6 | 88.23 | S-6 | 11.76 | potassium chloride | 0.0050 | 99.995/0.005 |
| | | | | | | | potassium chloride | | 99.995/0.005 |
| Comparative Example | 1 | f-1 | B-2 | 92.2 | — | 0 | sodium chloride | 7.8 | 92.2/7.8 |
| | 2 | f-2 | A-8 | 85.95 | S-6 | 9.55 | sodium oleate | 4.5 | 95.5/4.5 |
| | 3 | f-3 | A-2 | 62.5 | S-6 | 37.5 | — | 0 | 100/0 |
| | 4 | f-4 | A-2 | 75 | S-6 | 25 | — | 0 | 100/0 |
| | 5 | f-5 | — | 0 | S-2 | 98 | sodium chloride | 0 | 98/0 |
| | 6 | f-6 | A-8 | 40 | S-6 | 20 | sodium oleate | 40 | 60/40 |

In Table 1,
*1 is a mass ratio of (nonionic surfactant + organic sulfonate salt)/inorganic salt,
A-1 represents a partial ester of diglycerol with lauric acid,
A-2 represents a partial ester of diglycerol with stearic acid,
A-3 represents a partial ester of glycerol with oleic acid,
A-4 represents a partial ester of sorbitan with lauric acid,
A-5 represents a partial ester of tetraglycerol with hexanoic acid,
A-6 represents a partial ester of diglycerol with docosanoic acid,
A-7 represents a partial ester of glycerol with acetic acid,
A-8 represents a partial ester of decaglycerol with lauric acid,
B-1 represents lauryldiethanolamide,
B-2 represents stearyldiethanolamide,
B-3 represents oleyldiethanolamide,
B-4 represents octyldiethanolamide,
B-5 represents docosyldiethanolamide,
B-6 represents lauryldiethanolamine,
C-1 represents an adduct of 9 mol of ethylene oxide to lauric acid,
C-2 represents an adduct of 7 mol of ethylene oxide to oleic acid,
C-3 represents an adduct of 13 mol of propylene oxide to stearic acid,
C-4 represents an adduct of 50 mol of ethylene oxide to octanoic acid,
C-5 represents an adduct of 300 mol of ethylene oxide to lauric acid,
D-1 represents an ester of an ethylene oxide adduct (addition molar number: 9) of lauric acid with lauric acid,
D-2 represents an ester of an ethylene oxide adduct (addition molar number: 7) of oleic acid with oleic acid,
D-3 represents an ester of a propylene oxide adduct (addition molar number: 13) of stearic acid with stearic acid,
D-4 represents an ester of an ethylene oxide adduct (addition molar number: 50) of octanoic acid with octanoic acid,
D-5 represents an ester of an ethylene oxide adduct (addition molar number: 300) of lauric acid with lauric acid,
E-1 represents an adduct of 10 mol of polyethylene oxide to lauryl alcohol,
E-2 represents an adduct of 6 mol of polyethylene oxide to oleyl alcohol,
E-3 represents an adduct of 15 mol of polypropylene oxide to stearyl alcohol,
E-4 represents an adduct of 60 mol of polyethylene oxide to octyl alcohol,
E-5 represents a random EO adduct of 75 mol of polyethylene oxide/75 mol of polypropylene oxide to lauryl alcohol,
S-1 represents a sodium alkylsulfonate whose alkyl group has 13 to 18 carbon atoms,
S-2 represents sodium pentadecylsulfonate,
S-3 represents sodium hexylsulfonate,
S-4 represents sodium behenylsulfonate,
S-5 represents a sodium alkylbenzenesulfonate whose alkyl group has 10 to 16 carbon atoms,
S-6 represents sodium dedecylbenzenesulfonate,
S-7 represents lithium dedecylbenzenesulfonate, and
S-8 represents sodium dioctyl sulfosuccinate.

Test Section 2 (Production 1 of Laminated Films)

Example 44

87 parts of an ethylene-(1-hexene) copolymer (density: 0.930 g/cm$^3$, MRF: 1.0 g/10 min, ethylene copolymerization ratio: 96%) (R-1) as an olefin resin, 10 parts of the polyolefin resin modifier (F-1) prepared in Test Section 1, and 3 parts of a silica (average particle diameter: 3 μm, amorphous) as an anti-blocking agent were homogeneously mixed to thereby fabricate a master batch having a concentration of the modifier of the present invention of 10% and a concentration of the silica of 3%, and thereafter, 20 parts of the master batch and 80 parts of the above ethylene-(1-hexene) copolymer (R-1) were mixed with a tumbler blender. By using the obtained mixture for an outer layer (A layer) on one side, and the above ethylene-(1-hexene) copolymer (R-1) for a middle layer (B layer) and an outer layer (C layer) on the other side, these were coextruded under cooling at 30° C. by a T die method to thereby produce a 3-layer laminated film of 60 μm in thickness (the ratio of thicknesses of the layers was A layer/B layer/C layer=1/4/1).

Examples 45 to 86 and Comparative Examples 7 to 12

Laminated films of Examples 45 to 86 and Comparative Examples 7 to 12 were produced as in the production of the laminated film of Example 44. The details of the produced laminated films of those examples and comparative examples are shown in Table 2 collectively with the details of the laminated film of Example 44.

TABLE 2

| | Item | Polyolefin Resin used for A Layer Kind | Content (parts) | Polyolefin Resin Modifier Kind | Content (parts) | Kind of Polyolefin Resin used for B Layer | Kind of Polyolefin Resin used for C Layer |
|---|---|---|---|---|---|---|---|
| Example | 44 | R-1 | 98.00 | F-1 | 2.0 | R-1 | R-1 |
| | 45 | R-2 | 98.20 | F-2 | 1.8 | R-2 | R-2 |
| | 46 | R-3 | 98.50 | F-3 | 1.5 | R-3 | R-3 |
| | 47 | R-4 | 97.60 | F-4 | 2.4 | R-4 | R-4 |
| | 48 | R-2 | 98.50 | F-5 | 1.5 | R-2 | R-2 |
| | 49 | R-2 | 97.60 | F-6 | 2.4 | R-2 | R-2 |
| | 50 | R-2 | 97.90 | F-7 | 2.1 | R-2 | R-2 |
| | 51 | R-2 | 98.10 | F-8 | 1.9 | R-2 | R-2 |
| | 52 | R-2 | 99.80 | F-9 | 0.2 | R-2 | R-2 |
| | 53 | R-2 | 98.18 | F-10 | 1.8 | R-2 | R-2 |
| | 54 | R-2 | 98.30 | F-11 | 1.7 | R-2 | R-2 |
| | 55 | R-2 | 99.50 | F-12 | 0.5 | R-2 | R-2 |
| | 56 | R-1 | 97.00 | F-13 | 3.0 | R-1 | R-1 |
| | 57 | R-2 | 97.30 | F-14 | 2.7 | R-2 | R-2 |
| | 58 | R-3 | 98.00 | F-15 | 2.0 | R-3 | R-3 |
| | 59 | R-4 | 95.20 | F-16 | 4.8 | R-4 | R-4 |
| | 60 | R-2 | 98.60 | F-17 | 1.4 | R-2 | R-2 |
| | 61 | R-2 | 98.30 | F-18 | 1.7 | R-2 | R-2 |
| | 62 | R-2 | 97.20 | F-19 | 2.8 | R-2 | R-2 |
| | 63 | R-2 | 95.20 | F-20 | 4.8 | R-2 | R-2 |
| | 64 | R-2 | 96.80 | F-21 | 3.2 | R-2 | R-2 |
| | 65 | R-2 | 97.10 | F-22 | 2.9 | R-2 | R-2 |
| | 66 | R-2 | 98.40 | F-23 | 1.6 | R-2 | R-2 |
| | 67 | R-2 | 98.00 | F-24 | 2.0 | R-2 | R-2 |
| | 68 | R-1 | 98.80 | F-25 | 1.2 | R-1 | R-1 |
| | 69 | R-2 | 96.50 | F-26 | 3.5 | R-2 | R-2 |
| | 70 | R-3 | 98.00 | F-27 | 2.0 | R-3 | R-3 |
| | 71 | R-4 | 96.00 | F-28 | 4.0 | R-4 | R-4 |
| | 72 | R-2 | 95.50 | F-29 | 4.5 | R-2 | R-2 |
| | 73 | R-2 | 97.00 | F-30 | 3.0 | R-2 | R-2 |
| | 74 | R-2 | 97.80 | F-31 | 2.2 | R-2 | R-2 |
| | 75 | R-2 | 97.90 | F-32 | 2.1 | R-2 | R-2 |
| | 76 | R-2 | 98.20 | F-33 | 1.8 | R-2 | R-2 |
| | 77 | R-2 | 98.50 | F-34 | 1.5 | R-2 | R-2 |
| | 78 | R-1 | 97.00 | F-35 | 3.0 | R-1 | R-1 |
| | 79 | R-2 | 97.50 | F-36 | 2.5 | R-2 | R-2 |
| | 80 | R-3 | 98.30 | F-37 | 1.7 | R-3 | R-3 |
| | 81 | R-4 | 97.60 | F-38 | 2.4 | R-4 | R-4 |
| | 82 | R-1 | 94.00 | F-39 | 6.0 | R-1 | R-1 |
| | 83 | R-2 | 97.60 | F-40 | 5.8 | R-2 | R-2 |
| | 84 | R-3 | 98.28 | F-41 | 5.9 | R-3 | R-3 |
| | 85 | R-4 | 97.20 | F-42 | 5.2 | R-4 | R-4 |
| | 86 | R-2 | 97.20 | F-43 | 3.4 | R-2 | R-2 |
| Comparative Example | 7 | R-1 | 99.30 | f-1 | 0.7 | R-1 | R-1 |
| | 8 | R-2 | 97.80 | f-2 | 2.2 | R-2 | R-2 |
| | 9 | R-3 | 99.20 | f-3 | 0.8 | R-3 | R-3 |
| | 10 | R-4 | 98.80 | f-4 | 1.2 | R-4 | R-4 |
| | 11 | R-2 | 98.63 | f-5 | 1.4 | R-2 | R-2 |
| | 12 | R-2 | 89.00 | f-6 | 11 | R-2 | R-2 |

In Table 2,
R-1 represents an ethylene-(1-hexene) copolymer (density: 0.930 g/cm$^3$, MRF: 1.0 g/10 min, ethylene copolymerization ratio: 96%),
R-2 represents an ethylene-(1-butene) copolymer (density: 0.920 g/cm$^3$, MRF: 2.1 g/10 min, ethylene copolymerization ratio: 95%),
R-3 represents an ethylene-propylene copolymer (density: 0.90 g/cm$^3$, MRF: 7.0 g/10 min, ethylene copolymerization ratio: 4%),
R-4 represents an ethylene-(1-butene) copolymer (density: 0.93 g/cm$^3$, MRF: 4.0 g/10 min, ethylene copolymerization ratio: 95%), and
F-1 to F-43 and f-1 to f-6 each represent the polyolefin resin modifier prepared in Test Section 1 and shown in Table 1

Test Section 3 (Evaluation 1 of the Laminated Films)
Evaluation of the Antifogging Properties The laminated films produced in Test Section 2 were humidity conditioned under the condition of 20° C. and a relative humidity of 65% for 24 hours, and thereafter adhered on a beaker having water at 20° C. put therein so that the A layer directed inward and left in an atmosphere of 5° C. for 0.5 hours; then, the degree of deposition of water droplets on the A layer was observed and the antifogging properties were evaluated based on the following criteria. Further, for the laminated films humidity conditioned under the condition of 40° C. and a relative humidity of 50% for 4 weeks, the antifogging properties were similarly evaluated as stability with time. The evaluation results are collectively shown in Table 3.

Evaluation Criteria of the Antifogging Properties

∘∘: exhibiting no deposition of water droplets and being transparent; being remarkably excellent in the antifogging properties ∘: exhibiting deposition of large water droplets, but being transparent; being excellent in the antifogging properties x: exhibiting deposition of a large number of small water droplets, and being opaque; being inferior in the antifogging properties Evaluation of the Transparency The laminated films produced in Test Section 2 were humidity conditioned under the condition of 20° C. and a relative humidity of 65% for 24 hours, and thereafter, the haze thereof was measured by using a haze meter (trade name: NDH-5000, manufactured by Nippon Denshoku Industries Co., Ltd.), and the transparency was evaluated based on the following criteria. The evaluation results are collectively shown in Table 3.

Evaluation Criteria of the Transparency

○○: being lower than 10% (being excellent in the transparency)

○: being 10% or higher and lower than 15% (being good in the transparency)

x: being 15% or higher (being inferior in the transparency)

Evaluation of the Antistaticity

The laminated films produced in Test Section 2 were humidity conditioned under the condition of 20° C. and a relative humidity of 65% for 24 hours, and thereafter, the surface specific resistance (Ω/□) thereof was measured under the same condition by using a surface resistance meter (trade name: Super Megohmmeter SM-8220, manufactured by HIOKI E.E. CORPORATION), and the antistaticity was evaluated based on the following criteria. The results are collectively shown in Table 3. Further, for the laminated films stored for 4 weeks under the condition of 40° C. and a relative humidity of 50%, the antistaticity was similarly evaluated as stability with time. The evaluation results are collectively shown in Table 3.

Evaluation Criteria of the Antistaticity

○○: the surface specific resistance was lower than $1 \times 10^{12}$ Ω/□

○: the surface specific resistance was $1 \times 10^{12}$ Ω/□ or higher and lower than $1 \times 10^{13}$ Ω/□ x: the surface specific resistance was $1 \times 10^{13}$ Ω/□ or higher

Evaluation of the Film-Forming Stability

When the laminated films were formed in Test Section 2, the film-forming stability of the films was visually observed, and evaluated based on the following criteria. The evaluation results are collectively shown in Table 3.

Evaluation Criteria of the Film-Forming Stability

○: the formed film exhibited no extrusion fluctuation, and the film having a stable film thickness was obtained.

x: the formed film exhibited extrusion fluctuation, and no film having a stable film thickness was obtained.

TABLE 3

| | | Antifogging Properties | | | Antistaticity | | Film |
|---|---|---|---|---|---|---|---|
| Item | | After 0.5 hours | Stability With Time | Transparency | After 24 hours | Stability With Time | Forming Stability |
| Example | 44 | ○○ | ○○ | ○○ | ○○ | ○○ | ○ |
| | 45 | ○○ | ○○ | ○○ | ○○ | ○○ | ○ |
| | 46 | ○○ | ○○ | ○○ | ○○ | ○○ | ○ |
| | 47 | ○○ | ○○ | ○○ | ○○ | ○○ | ○ |
| | 48 | ○○ | ○○ | ○○ | ○○ | ○○ | ○ |
| | 49 | ○○ | ○○ | ○○ | ○○ | ○○ | ○ |
| | 50 | ○○ | ○○ | ○○ | ○○ | ○○ | ○ |
| | 51 | ○○ | ○○ | ○○ | ○○ | ○○ | ○ |
| | 52 | ○○ | ○○ | ○○ | ○○ | ○○ | ○ |
| | 53 | ○○ | ○○ | ○○ | ○○ | ○○ | ○ |
| | 54 | ○○ | ○○ | ○○ | ○○ | ○○ | ○ |
| | 55 | ○○ | ○○ | ○○ | ○○ | ○○ | ○ |
| | 56 | ○○ | ○○ | ○○ | ○○ | ○ | ○ |
| | 57 | ○○ | ○○ | ○○ | ○○ | ○ | ○ |
| | 58 | ○ | ○○ | ○○ | ○○ | ○○ | ○ |
| | 59 | ○ | ○○ | ○○ | ○○ | ○○ | ○ |
| | 60 | ○ | ○○ | ○○ | ○○ | ○○ | ○ |
| | 61 | ○ | ○○ | ○○ | ○○ | ○○ | ○ |
| | 62 | ○○ | ○○ | ○○ | ○○ | ○ | ○ |
| | 63 | ○○ | ○○ | ○○ | ○○ | ○ | ○ |
| | 64 | ○○ | ○○ | ○○ | ○○ | ○ | ○ |
| | 65 | ○○ | ○○ | ○○ | ○○ | ○ | ○ |
| | 66 | ○○ | ○○ | ○○ | ○○ | ○ | ○ |
| | 67 | ○○ | ○○ | ○○ | ○○ | ○ | ○ |
| | 68 | ○ | ○○ | ○○ | ○ | ○ | ○ |
| | 69 | ○ | ○○ | ○○ | ○ | ○ | ○ |
| | 70 | ○ | ○○ | ○○ | ○ | ○ | ○ |
| | 71 | ○ | ○○ | ○○ | ○ | ○ | ○ |
| | 72 | ○ | ○○ | ○○ | ○ | ○ | ○ |
| | 73 | ○ | ○○ | ○○ | ○ | ○ | ○ |
| | 74 | ○ | ○○ | ○○ | ○ | ○ | ○ |
| | 75 | ○ | ○○ | ○○ | ○ | ○ | ○ |
| | 76 | ○ | ○○ | ○○ | ○ | ○ | ○ |
| | 77 | ○ | ○○ | ○○ | ○ | ○ | ○ |
| | 78 | ○ | ○ | ○○ | ○ | ○ | ○ |
| | 79 | ○ | ○ | ○○ | ○ | ○ | ○ |
| | 80 | ○ | ○ | ○○ | ○ | ○ | ○ |
| | 81 | ○ | ○ | ○○ | ○ | ○ | ○ |
| | 82 | ○ | ○ | ○ | ○ | ○ | ○ |
| | 83 | ○ | ○ | ○ | ○ | ○ | ○ |
| | 84 | ○ | ○ | ○ | ○ | ○ | ○ |
| | 85 | ○ | ○ | ○ | ○ | ○ | ○ |
| | 86 | ○ | ○ | ○ | ○ | ○ | ○ |

TABLE 3-continued

| Item | | After 0.5 hours (Antifogging Properties) | Stability With Time (Antifogging Properties) | Transparency | After 24 hours (Antistaticity) | Stability With Time (Antistaticity) | Film Forming Stability |
|---|---|---|---|---|---|---|---|
| Comparative Example | 7 | x | x | ○○ | x | x | ○ |
| | 8 | x | ○ | ○○ | ○ | x | ○ |
| | 9 | x | ○ | ○○ | ○ | ○ | ○ |
| | 10 | x | ○ | ○○ | ○ | ○ | ○ |
| | 11 | x | x | x | ○ | ○ | ○ |
| | 12 | ○ | x | ○ | x | x | x |

Test Section 4 (Production of Modified Polyolefin Resin Films)

Example 87

By using the polyolefin resin (R-1), the polyolefin resin modifier (F-1) prepared in Test Section 1, and the silica, a master batch having a concentration of the polyolefin resin modifier of 10% and a concentration of the silica of 3% was fabricated as in Test Section 2, and thereafter mixed with the polyolefin resin (R-1) with a tumbler blender. By using the obtained mixture, a modified polyolefin resin film (N-1) of 60 μm in thickness was produced by an inflation method.

Examples 88 to 129 and Comparative Examples 13 to 18

Modified polyolefin resin films (N-2) to (N-43) and (n-1) to (n-6) of Examples 88 to 129 and Comparative Examples 13 to 18, respectively, were produced as in the production of the modified polyolefin resin film (N-1) of Example 87. The details of the modified polyolefin resin films of those examples and comparative examples are shown in Table 4 collectively with the details of the modified polyolefin resin film of Example 87.

TABLE 4

| Item | | Kind of Modified Polyolefin Resin Film | Polyolefin Resin Kind | Polyolefin Resin Content (%) | Polyolefin Resin Modifier Kind | Polyolefin Resin Modifier Content (%) |
|---|---|---|---|---|---|---|
| Example | 87 | N-1 | R-1 | 98.00 | F-1 | 2.0 |
| | 88 | N-2 | R-2 | 98.20 | F-2 | 1.8 |
| | 89 | N-3 | R-3 | 98.50 | F-3 | 1.5 |
| | 90 | N-4 | R-4 | 97.60 | F-4 | 2.4 |
| | 91 | N-5 | R-2 | 98.50 | F-5 | 1.5 |
| | 92 | N-6 | R-2 | 97.60 | F-6 | 2.4 |
| | 93 | N-7 | R-2 | 97.90 | F-7 | 2.1 |
| | 94 | N-8 | R-2 | 98.10 | F-8 | 1.9 |
| | 95 | N-9 | R-2 | 99.80 | F-9 | 0.2 |
| | 96 | N-10 | R-2 | 98.18 | F-10 | 1.8 |
| | 97 | N-11 | R-2 | 98.30 | F-11 | 1.7 |
| | 98 | N-12 | R-2 | 99.50 | F-12 | 0.5 |
| | 99 | N-13 | R-1 | 97.00 | F-13 | 3.0 |
| | 100 | N-14 | R-2 | 97.30 | F-14 | 2.7 |
| | 101 | N-15 | R-3 | 98.00 | F-15 | 2.0 |
| | 102 | N-16 | R-4 | 95.20 | F-16 | 4.8 |
| | 103 | N-17 | R-2 | 98.60 | F-17 | 1.4 |
| | 104 | N-18 | R-2 | 98.30 | F-18 | 1.7 |
| | 105 | N-19 | R-2 | 97.20 | F-19 | 2.8 |
| | 106 | N-20 | R-2 | 95.20 | F-20 | 4.8 |
| | 107 | N-21 | R-2 | 96.80 | F-21 | 3.2 |
| | 108 | N-22 | R-2 | 97.10 | F-22 | 2.9 |
| | 109 | N-23 | R-2 | 98.40 | F-23 | 1.6 |
| | 110 | N-24 | R-2 | 98.00 | F-24 | 2.0 |
| | 111 | N-25 | R-1 | 98.80 | F-25 | 1.2 |
| | 112 | N-26 | R-2 | 96.50 | F-26 | 3.5 |
| | 113 | N-27 | R-3 | 98.00 | F-27 | 2.0 |
| | 114 | N-28 | R-4 | 96.00 | F-28 | 4.0 |
| | 115 | N-29 | R-2 | 95.50 | F-29 | 4.5 |
| | 116 | N-30 | R-2 | 97.00 | F-30 | 3.0 |
| | 117 | N-31 | R-2 | 97.80 | F-31 | 2.2 |
| | 118 | N-32 | R-2 | 97.90 | F-32 | 2.1 |
| | 119 | N-33 | R-2 | 98.20 | F-33 | 1.8 |
| | 120 | N-34 | R-2 | 98.50 | F-34 | 1.5 |
| | 121 | N-35 | R-1 | 97.00 | F-35 | 3.0 |
| | 122 | N-36 | R-2 | 97.50 | F-36 | 2.5 |
| | 123 | N-37 | R-3 | 98.30 | F-37 | 1.7 |
| | 124 | N-38 | R-4 | 97.60 | F-38 | 2.4 |
| | 125 | N-39 | R-1 | 94.00 | F-39 | 6.0 |
| | 126 | N-40 | R-2 | 97.60 | F-40 | 5.8 |
| | 127 | N-41 | R-3 | 98.28 | F-41 | 5.9 |
| | 128 | N-42 | R-4 | 97.20 | F-42 | 5.2 |
| | 129 | N-43 | R-2 | 97.20 | F-43 | 3.4 |
| Comparative Example | 13 | n-1 | R-1 | 99.30 | f-1 | 0.7 |
| | 14 | n-2 | R-2 | 97.80 | f-2 | 2.2 |
| | 15 | n-3 | R-3 | 99.20 | f-3 | 0.8 |
| | 16 | n-4 | R-4 | 98.80 | f-4 | 1.2 |
| | 17 | n-5 | R-2 | 98.63 | f-5 | 1.4 |
| | 18 | n-6 | R-2 | 70.00 | f-5 | 30 |

Test Section 5 (Evaluation of the Modified Polyolefin Resin Films)

For the modified polyolefin resin films produced in Test Section 4, evaluations of the antifogging properties, the transparency, the antistaticity, and the film formability were carried out as in Test Section 3. The evaluation results are collectively shown in Table 5.

TABLE 5

| Item | | Kind of Modified Polyolefin Resin Film | After 0.5 hours (Antifogging Properties) | Stability With Time (Antifogging Properties) | Transparency | After 24 hours (Antistaticity) | Stability With Time (Antistaticity) | Film Forming Stability |
|---|---|---|---|---|---|---|---|---|
| Example | 87 | N-1 | ○○ | ○○ | ○○ | ○○ | ○○ | ○ |
| | 88 | N-2 | ○○ | ○○ | ○○ | ○○ | ○○ | ○ |

TABLE 5-continued

| Item | | Kind of Modified Polyolefin Resin Film | Antifogging Properties | | Transparency | Antistaticity | | Film Forming Stability |
|---|---|---|---|---|---|---|---|---|
| | | | After 0.5 hours | Stability With Time | | After 24 hours | Stability With Time | |
| | 89 | N-3 | ⊙⊙ | ⊙⊙ | ⊙⊙ | ⊙⊙ | ⊙⊙ | ⊙ |
| | 90 | N-4 | ⊙⊙ | ⊙⊙ | ⊙⊙ | ⊙⊙ | ⊙⊙ | ⊙ |
| | 91 | N-5 | ⊙⊙ | ⊙⊙ | ⊙⊙ | ⊙⊙ | ⊙⊙ | ⊙ |
| | 92 | N-6 | ⊙⊙ | ⊙⊙ | ⊙⊙ | ⊙⊙ | ⊙⊙ | ⊙ |
| | 93 | N-7 | ⊙⊙ | ⊙⊙ | ⊙⊙ | ⊙⊙ | ⊙⊙ | ⊙ |
| | 94 | N-8 | ⊙⊙ | ⊙⊙ | ⊙⊙ | ⊙⊙ | ⊙⊙ | ⊙ |
| | 95 | N-9 | ⊙⊙ | ⊙⊙ | ⊙⊙ | ⊙⊙ | ⊙⊙ | ⊙ |
| | 96 | N-10 | ⊙⊙ | ⊙⊙ | ⊙⊙ | ⊙⊙ | ⊙⊙ | ⊙ |
| | 97 | N-11 | ⊙⊙ | ⊙⊙ | ⊙⊙ | ⊙⊙ | ⊙⊙ | ⊙ |
| | 98 | N-12 | ⊙⊙ | ⊙⊙ | ⊙⊙ | ⊙⊙ | ⊙⊙ | ⊙ |
| | 99 | N-13 | ⊙⊙ | ⊙⊙ | ⊙⊙ | ⊙⊙ | ⊙ | ⊙ |
| | 100 | N-14 | ⊙⊙ | ⊙⊙ | ⊙⊙ | ⊙⊙ | ⊙ | ⊙ |
| | 101 | N-15 | ⊙ | ⊙⊙ | ⊙⊙ | ⊙⊙ | ⊙⊙ | ⊙ |
| | 102 | N-16 | ⊙ | ⊙⊙ | ⊙⊙ | ⊙⊙ | ⊙⊙ | ⊙ |
| | 103 | N-17 | ⊙ | ⊙⊙ | ⊙⊙ | ⊙⊙ | ⊙⊙ | ⊙ |
| | 104 | N-18 | ⊙ | ⊙⊙ | ⊙⊙ | ⊙⊙ | ⊙⊙ | ⊙ |
| | 105 | N-19 | ⊙⊙ | ⊙⊙ | ⊙⊙ | ⊙⊙ | ⊙ | ⊙ |
| | 106 | N-20 | ⊙⊙ | ⊙⊙ | ⊙⊙ | ⊙⊙ | ⊙ | ⊙ |
| | 107 | N-21 | ⊙⊙ | ⊙⊙ | ⊙⊙ | ⊙⊙ | ⊙ | ⊙ |
| | 108 | N-22 | ⊙⊙ | ⊙⊙ | ⊙⊙ | ⊙⊙ | ⊙ | ⊙ |
| | 109 | N-23 | ⊙⊙ | ⊙⊙ | ⊙⊙ | ⊙⊙ | ⊙ | ⊙ |
| | 110 | N-24 | ⊙⊙ | ⊙⊙ | ⊙⊙ | ⊙⊙ | ⊙ | ⊙ |
| | 111 | N-25 | ⊙ | ⊙⊙ | ⊙⊙ | ⊙ | ⊙ | ⊙ |
| | 112 | N-26 | ⊙ | ⊙⊙ | ⊙⊙ | ⊙ | ⊙ | ⊙ |
| | 113 | N-27 | ⊙ | ⊙⊙ | ⊙⊙ | ⊙ | ⊙ | ⊙ |
| | 114 | N-28 | ⊙ | ⊙⊙ | ⊙⊙ | ⊙ | ⊙ | ⊙ |
| | 115 | N-29 | ⊙ | ⊙⊙ | ⊙⊙ | ⊙ | ⊙ | ⊙ |
| | 116 | N-30 | ⊙ | ⊙⊙ | ⊙⊙ | ⊙ | ⊙ | ⊙ |
| | 117 | N-31 | ⊙ | ⊙⊙ | ⊙⊙ | ⊙ | ⊙ | ⊙ |
| | 118 | N-32 | ⊙ | ⊙⊙ | ⊙⊙ | ⊙ | ⊙ | ⊙ |
| | 119 | N-33 | ⊙ | ⊙⊙ | ⊙⊙ | ⊙ | ⊙ | ⊙ |
| | 120 | N-34 | ⊙ | ⊙⊙ | ⊙⊙ | ⊙ | ⊙ | ⊙ |
| | 121 | N-35 | ⊙ | ⊙ | ⊙⊙ | ⊙ | ⊙ | ⊙ |
| | 122 | N-36 | ⊙ | ⊙ | ⊙⊙ | ⊙ | ⊙ | ⊙ |
| | 123 | N-37 | ⊙ | ⊙ | ⊙⊙ | ⊙ | ⊙ | ⊙ |
| | 124 | N-38 | ⊙ | ⊙ | ⊙⊙ | ⊙ | ⊙ | ⊙ |
| | 125 | N-39 | ⊙ | ⊙ | ⊙ | ⊙ | ⊙ | ⊙ |
| | 126 | N-40 | ⊙ | ⊙ | ⊙ | ⊙ | ⊙ | ⊙ |
| | 127 | N-41 | ⊙ | ⊙ | ⊙ | ⊙ | ⊙ | ⊙ |
| | 128 | N-42 | ⊙ | ⊙ | ⊙ | ⊙ | ⊙ | ⊙ |
| | 129 | N-43 | ⊙ | ⊙ | ⊙ | ⊙ | ⊙ | ⊙ |
| Comparative Example | 13 | n-1 | x | x | ⊙⊙ | x | x | ⊙ |
| | 14 | n-2 | x | ⊙ | ⊙⊙ | ⊙ | x | ⊙ |
| | 15 | n-3 | x | ⊙ | ⊙⊙ | ⊙ | ⊙ | ⊙ |
| | 16 | n-4 | x | ⊙ | ⊙⊙ | ⊙ | ⊙ | ⊙ |
| | 17 | n-5 | x | x | x | ⊙ | ⊙ | ⊙ |
| | 18 | n-6 | ⊙ | x | ⊙ | x | x | x |

Test Section 6 (Production 2 of Laminated Films)

Example 130

A polyurethane adhesive (an adhesive (T-1) prepared by diluting a mixture of aromatic ether adhesives of Takelac A-969V/Takenate A-5=3/1 (mass ratio) by trade names manufactured by Mitsui Chemicals Inc. with ethyl acetate so that the solids concentration was equal to 20%) was applied onto a base film (biaxially stretched polyamide film, thickness: 15 μm) (K-1) so that the coating weight was equal to 4 g/m² (solids), and dried at 80° C. for 90 seconds; thereafter, the resultant was laminated with the modified polyolefin resin film (N-1) produced in Test Section 4 by a nip roll, and was left at 40° C. for 24 hours to cure the adhesive to thereby obtain a laminated film.

Examples 131 to 172 and Comparative Examples 19 to 24

Laminated films of Examples 131 to 172 and Comparative Examples 19 to 24 were produced as in the production of the laminated film of Example 130. The details of the laminated films produced in the above are shown in Table 6 collectively with the details of Example 130.

TABLE 6

| Item | | Kind of Modified Polyolefin Resin Film | Kind of Base Film | Kind of Adhesive |
|---|---|---|---|---|
| Example | 130 | N-1 | K-1 | T-1 |
| | 131 | N-2 | K-1 | T-2 |
| | 132 | N-3 | K-1 | T-3 |
| | 133 | N-4 | K-1 | T-4 |
| | 134 | N-5 | K-1 | T-5 |
| | 135 | N-6 | K-1 | T-6 |
| | 136 | N-7 | K-2 | T-3 |
| | 137 | N-8 | K-3 | T-5 |
| | 138 | N-9 | K-2 | T-1 |
| | 139 | N-10 | K-2 | T-1 |
| | 140 | N-11 | K-2 | T-1 |
| | 141 | N-12 | K-2 | T-1 |
| | 142 | N-13 | K-1 | T-1 |

TABLE 6-continued

| Item | | Kind of Modified Polyolefin Resin Film | Kind of Base Film | Kind of Adhesive |
|---|---|---|---|---|
| | 143 | N-14 | K-1 | T-2 |
| | 144 | N-15 | K-1 | T-3 |
| | 145 | N-16 | K-1 | T-4 |
| | 146 | N-17 | K-1 | T-5 |
| | 147 | N-18 | K-1 | T-6 |
| | 148 | N-19 | K-2 | T-3 |
| | 149 | N-20 | K-3 | T-5 |
| | 150 | N-21 | K-2 | T-1 |
| | 151 | N-22 | K-2 | T-1 |
| | 152 | N-23 | K-2 | T-1 |
| | 153 | N-24 | K-2 | T-1 |
| | 154 | N-25 | K-1 | T-1 |
| | 155 | N-26 | K-1 | T-2 |
| | 156 | N-27 | K-1 | T-3 |
| | 157 | N-28 | K-1 | T-4 |
| | 158 | N-29 | K-1 | T-5 |
| | 159 | N-30 | K-1 | T-6 |
| | 160 | N-31 | K-2 | T-3 |
| | 161 | N-32 | K-3 | T-5 |
| | 162 | N-33 | K-2 | T-1 |
| | 163 | N-34 | K-2 | T-1 |
| | 164 | N-35 | K-2 | T-1 |
| | 165 | N-36 | K-2 | T-1 |
| | 166 | N-37 | K-2 | T-1 |
| | 167 | N-38 | K-2 | T-1 |
| | 168 | N-39 | K-2 | T-1 |
| | 169 | N-40 | K-2 | T-1 |
| | 170 | N-41 | K-2 | T-1 |
| | 171 | N-42 | K-2 | T-1 |
| | 172 | N-43 | K-2 | T-1 |
| Comparative Example | 19 | n-1 | K-2 | T-1 |
| | 20 | n-2 | K-2 | T-1 |
| | 21 | n-3 | K-2 | T-1 |
| | 22 | n-4 | K-2 | T-1 |
| | 23 | n-5 | K-2 | T-1 |
| | 24 | n-6 | K-2 | T-1 |

In Table 6,

K-1 represents Emblem ON (trade name), manufactured by Unitika Ltd., thickness: 15 μm, K-2 represents E5100 (trade name), manufactured by Toyobo Co., Ltd., thickness: 12 μm, K-3 represents Pylen Film-OT P2108 (trade name), manufactured by Toyobo Co., Ltd., thickness: 30 μm, T-1 represents a polyurethane adhesive (an adhesive prepared by diluting a mixture of aromatic ether adhesives of Takelac A-969V/Takenate A-5 = 3/1 (mass ratio) by trade names manufactured by Mitsui Chemicals Inc. with ethyl acetate so that the solids concentration was equal to 20%), T-2 represents a polyurethane adhesive (an adhesive prepared by diluting a mixture of aromatic ester adhesives of Takelac A-515/Takenate A-3 = 3/1 (mass ratio) by trade names manufactured by Mitsui Chemicals Inc. with ethyl acetate so that the solids concentration was equal to 20%), T-3 represents a polyurethane adhesive (an adhesive prepared by diluting a mixture of aliphatic ester adhesives of Takelac A-385/Takenate A-50 = 3/1 (mass ratio) by trade names manufactured by Mitsui Chemicals Inc. with ethyl acetate so that the solids concentration was equal to 20%), T-4 represents a polyurethane adhesive (an adhesive prepared by diluting a mixture of aromatic ether adhesives of Takelac A-242B/Takenate A-242A = 3/1 (mass ratio) by trade names manufactured by Mitsui Chemicals Inc. with an ion-exchange water so that the solids concentration was equal to 20%), T-5 represents a polyurethane adhesive (an adhesive prepared by diluting a mixture of aliphatic ester adhesives of Takelac A-695/Takenate A-95 = 3/1 (mass ratio) by trade names manufactured by Mitsui Chemicals Inc. with an ion-exchange water so that the solids concentration was equal to 20%), and T-6 represents a polyurethane adhesive (an adhesive prepared by diluting an aromatic ether adhesive of Takelac A-260 by trade name manufactured by Mitsui Chemicals Inc. with an ion-exchange water so that the solids concentration was equal to 20%).

Test Section 7 (Evaluation 2 of the Laminated Films)

For the laminated films produced in Test Section 6, evaluations of the antifogging properties, the transparency, and the antistaticity were carried out as in Test Section 3. The evaluation results are collectively shown in Table 7.

TABLE 7

| Item | | Antifogging Properties After 0.5 hours | Antifogging Properties Stability With Time | Transparency | Antistaticity After 24 hours | Antistaticity Stability With Time |
|---|---|---|---|---|---|---|
| Example | 130 | ○○ | ○○ | ○○ | ○○ | ○○ |
| | 131 | ○○ | ○○ | ○○ | ○○ | ○○ |
| | 132 | ○○ | ○○ | ○○ | ○○ | ○○ |
| | 133 | ○○ | ○○ | ○○ | ○○ | ○○ |
| | 134 | ○○ | ○○ | ○○ | ○○ | ○○ |
| | 135 | ○○ | ○○ | ○○ | ○○ | ○○ |
| | 136 | ○○ | ○○ | ○○ | ○○ | ○○ |
| | 137 | ○○ | ○○ | ○○ | ○○ | ○○ |
| | 138 | ○○ | ○○ | ○○ | ○○ | ○○ |
| | 139 | ○○ | ○○ | ○○ | ○○ | ○○ |
| | 140 | ○○ | ○○ | ○○ | ○○ | ○○ |
| | 141 | ○○ | ○○ | ○○ | ○○ | ○○ |
| | 142 | ○○ | ○○ | ○○ | ○○ | ○ |
| | 143 | ○○ | ○○ | ○○ | ○○ | ○ |
| | 144 | ○ | ○○ | ○○ | ○○ | ○○ |
| | 145 | ○ | ○○ | ○○ | ○○ | ○○ |
| | 146 | ○ | ○○ | ○○ | ○○ | ○○ |
| | 147 | ○ | ○○ | ○○ | ○○ | ○○ |
| | 148 | ○○ | ○○ | ○○ | ○○ | ○ |
| | 149 | ○○ | ○○ | ○○ | ○○ | ○ |
| | 150 | ○○ | ○○ | ○○ | ○○ | ○ |
| | 151 | ○○ | ○○ | ○○ | ○○ | ○ |
| | 152 | ○○ | ○○ | ○○ | ○○ | ○ |
| | 153 | ○○ | ○○ | ○○ | ○○ | ○ |
| | 154 | ○ | ○○ | ○○ | ○ | ○ |
| | 155 | ○ | ○○ | ○○ | ○ | ○ |
| | 156 | ○ | ○○ | ○○ | ○ | ○ |
| | 157 | ○ | ○○ | ○○ | ○ | ○ |
| | 158 | ○ | ○○ | ○○ | ○ | ○ |
| | 159 | ○ | ○○ | ○○ | ○ | ○ |
| | 160 | ○ | ○○ | ○○ | ○ | ○ |
| | 161 | ○ | ○○ | ○○ | ○ | ○ |
| | 162 | ○ | ○○ | ○○ | ○ | ○ |
| | 163 | ○ | ○○ | ○○ | ○ | ○ |
| | 164 | ○ | ○ | ○○ | ○ | ○ |
| | 165 | ○ | ○ | ○○ | ○ | ○ |
| | 166 | ○ | ○ | ○○ | ○ | ○ |
| | 167 | ○ | ○ | ○○ | ○ | ○ |
| | 168 | ○ | ○ | ○ | ○ | ○ |
| | 169 | ○ | ○ | ○ | ○ | ○ |
| | 170 | ○ | ○ | ○ | ○ | ○ |
| | 171 | ○ | ○ | ○ | ○ | ○ |
| | 172 | ○ | ○ | ○ | ○ | ○ |
| Comparative Example | 19 | x | x | ○○ | x | x |
| | 20 | x | ○ | ○○ | ○ | x |
| | 21 | x | ○ | ○○ | ○ | ○ |
| | 22 | x | ○ | ○○ | ○ | ○ |
| | 23 | x | x | x | ○ | ○ |
| | 24 | ○ | x | ○ | x | x |

As is clear from the evaluation results of the examples against the comparative examples in Tables 3, 5, and 7 corresponding to Tables 1, 2, 4, and 6, according to the present invention, the excellent antistaticity and antifogging properties having persistency can be imparted to a polyolefin resin, and moreover, such antistaticity and antifogging properties can be developed in a short time, without adversely affecting transparency and film formability intrinsic to the polyolefin resin.

The invention claimed is:

1. A polyolefin resin composition comprising:
   a polyolefin resin; and
   a polyolefin resin modifier, wherein the polyolefin resin modifier contains a nonionic surfactant, an organic sulfonate salt, and an inorganic salt,
   the organic sulfonate salt is at least one selected from the group consisting of alkylsulfonic acid alkali metal salts whose alkyl group has 6 to 22 carbon atoms, alkylarylsulfonic acid alkali metal salts whose alkyl group has 6 to 22 carbon atoms, and sulfonic aliphatic carboxylic acid ester alkali metal salts whose alkyl group has 6 to 22 carbon atoms, and the inorganic salt is sodium sulfate and/or sodium chloride, and the polyolefin resin and the polyolefin resin modifier are contained in the polyolefin resin composition in amounts of 99.9% to 95.0% by mass and 0.1% to 5.0% by mass, receptively, so that the sum of the amounts of the polyolefin resin and the polyolefin resin modifier is equal to 100% by mass.

2. The polyolefin resin composition according to claim 1, wherein the nonionic surfactant, the organic sulfonate salt, and the inorganic salt are contained in the polyolefin resin modifier at a mass ratio of (the nonionic surfactant+the organic sulfonate salt)/the inorganic salt=99.9995/0.0005 to 75/25.

3. The polyolefin resin composition according to claim 1, wherein the organic sulfonate salt is at least one selected from the group consisting of alkylsulfonic acid alkali metal salts whose alkyl group has 6 to 22 carbon atoms.

4. The polyolefin resin composition according to claim 1, wherein the nonionic surfactant is at least one selected from the group consisting of partial esters of a tri- to hexa-hydric polyol with an aliphatic carboxylic acid having 6 to 22 carbon atoms, alkyldiethanolamides whose acyl group has 6 to 22 carbon atoms, ester compounds represented by Chemical Formula 1, ester compounds represented by Chemical Formula 2, and ether compounds represented by Chemical Formula 3, Chemical Formula 1

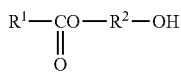

wherein $R^1$ is a hydrocarbon group having 5 to 21 carbon atoms, and $R^2$ is a residue of a (poly)oxyalkylene glycol from which all hydroxyl groups have been eliminated, the (poly) oxyalkylene glycol having 2 to 200 carbon atoms having a (poly)oxyalkylene group constituted of oxyalkylene units having 2 to 4 carbon atoms in its molecule;

Chemical Formula 2

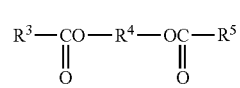

wherein $R^3$ and $R^5$ are each a hydrocarbon group having 5 to 21 carbon atoms, and $R^4$ is a residue of a (poly)oxyalkylene glycol from which all hydroxyl groups have been eliminated, the (poly) oxyalkylene glycol having 2 to 200 carbon atoms having a (poly)oxyalkylene group constituted of oxyalkylene units having 2 to 4 carbon atoms in is molecule; and

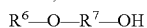 Chemical Formula 3:

wherein $R^6$ is a hydrocarbon group having 6 to 22 carbon atoms, and $R^7$ is a residue of a (poly)oxyalkylene glycol from which all hydroxyl groups have been eliminated, the (poly) oxyalkylene glycol having 2 to 200 carbon atoms having a (poly)oxyalkylene group constituted of oxyalkylene units having 2 to 4 carbon atoms in is molecule.

5. The polyolefin resin composition according to claim 4, wherein the nonionic surfactant is at least one selected from the group consisting of partial esters of a tri- to hexa-hydric polyol with an aliphatic carboxylic acid having 8 to 18 carbon atoms, ester compounds represented by Chemical Formula 1 in which $R^1$ is a hydrocarbon group having 7 to 17 carbon atoms, ester compounds represented by Chemical Formula 2 in which $R^3$ and $R^5$ are each a hydrocarbon group having 7 to 17 carbon atoms, and ether compounds represented by Chemical Formula 3 in which $R^6$ is a hydrocarbon group having 8 to 18 carbon atoms.

6. A modified polyolefin resin film, which is formed of the polyolefin resin composition according to claim 1.

7. A laminated film, which is a two- or more layer laminated film, wherein at least one surface layer of the laminated film is formed of the polyolefin resin composition according to claim 1.

* * * * *